(12) United States Patent
Kataoka et al.

(10) Patent No.: US 12,474,619 B2
(45) Date of Patent: Nov. 18, 2025

(54) OPTICAL MODULATOR AND OPTICAL TRANSMISSION DEVICE USING SAME

(71) Applicant: SUMITOMO OSAKA CEMENT CO., LTD., Tokyo (JP)

(72) Inventors: Toshio Kataoka, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 289 days.

(21) Appl. No.: 18/267,695

(22) PCT Filed: Dec. 23, 2021

(86) PCT No.: PCT/JP2021/047930
§ 371 (c)(1),
(2) Date: Jun. 15, 2023

(87) PCT Pub. No.: WO2022/145342
PCT Pub. Date: Jul. 7, 2022

(65) Prior Publication Data
US 2024/0061309 A1 Feb. 22, 2024

(30) Foreign Application Priority Data
Dec. 28, 2020 (JP) .................................. 2020-219102

(51) Int. Cl.
*G02F 1/225* (2006.01)
*G02B 6/42* (2006.01)
*G02F 1/035* (2006.01)

(52) U.S. Cl.
CPC ............ *G02F 1/225* (2013.01); *G02B 6/4277* (2013.01); *G02F 1/0356* (2013.01); *G02F 1/2255* (2013.01)

(58) Field of Classification Search
CPC ...... G02B 6/4277; G02B 6/4279; G02F 1/225; G02F 1/2255; G02F 1/035; G02F 1/0356
(Continued)

(56) References Cited

U.S. PATENT DOCUMENTS 5,042,895 A * 8/1991 Chouinard .............. G02F 1/225
385/132
2015/0070709 A1 * 3/2015 Porte .................. G01B 9/02049
356/482
(Continued)

FOREIGN PATENT DOCUMENTS

JP 10-239647 A 9/1998
JP 2001-174766 A 6/2001
(Continued)

*Primary Examiner* — Robert Tavlykaev
(74) *Attorney, Agent, or Firm* — IpHorgan Ltd.

(57) ABSTRACT

An optical modulator that can suppress crosstalk of a modulation signal even in a case where a wiring substrate is disposed to overlap with a modulation substrate is provided. An optical modulator includes a modulation substrate 1 that includes an optical waveguide and a modulation electrode 10 for modulating a light wave which propagates through the optical waveguide, and a wiring substrate 2 provided with wiring 22 for relaying a modulation signal to be applied to the modulation electrode 10, in which the wiring substrate is disposed to overlap with the modulation substrate to cover an action portion on which modulation is performed by the modulation electrode, and an electromagnetic wave absorption member SH is disposed at at least a part of a position facing the action portion in the wiring substrate.

9 Claims, 9 Drawing Sheets

(58) Field of Classification Search
USPC .......................................................... 385/1–3
See application file for complete search history.

(56) References Cited

U.S. PATENT DOCUMENTS

| | | | |
|---|---|---|---|
| 2016/0161771 A1* | 6/2016 | Sugiyama | G02F 1/0316 |
| | | | 385/3 |
| 2018/0102847 A1 | 4/2018 | Kim | |
| 2021/0240049 A1 | 8/2021 | Abe | |
| 2022/0197103 A1 | 6/2022 | Nakata | |

FOREIGN PATENT DOCUMENTS

| | | | | |
|---|---|---|---|---|
| JP | 2014-191250 A | 10/2014 | | |
| JP | 2016-071199 A | 5/2016 | | |
| JP | 2017-68071 A * | 4/2017 | ............ | G02F 1/035 |
| WO | 2019/239683 A1 | 12/2019 | | |
| WO | 2020/202607 A1 | 10/2020 | | |

* cited by examiner

OPTICAL MODULATOR AND OPTICAL TRANSMISSION DEVICE USING SAME

CROSS REFERENCE TO RELATED APPLICATIONS

This application is a national stage completion application of PCT Application No. PCT/JP2021/047930, filed Dec. 23, 2021, and claims priority from Japanese Patent Application No. 2020-219102 filed Dec. 28, 2020. Each of these applications is incorporated by reference herein in its entirety.

TECHNICAL FIELD

The present invention relates to an optical modulator and an optical transmission apparatus and, particularly relates to an optical modulator including a modulation substrate that includes an optical waveguide and a modulation electrode for modulating a light wave which propagates through the optical waveguide, and a wiring substrate provided with wiring for relaying a modulation signal to be applied to the modulation electrode.

BACKGROUND ART

In the field of optical communication or in the field of optical measurement, optical modulators using a modulation substrate that includes an optical waveguide and a modulation electrode which modulates a light wave propagating through the optical waveguide have been widely used. Optical modulators in recent years have been required to have wider bandwidths or be reduced in size. A plurality of different radio frequency signals are applied to one optical modulator at the same time.

In a case where the modulation signal is a microwave of 60 GHz or higher, the signal has high directivity, and a transmission loss is increased in a case where direct connection is made to the modulation electrode of the modulation substrate using wire bonding. Thus, Patent Literature No. 1 suggests a structure in which a wiring substrate is disposed to overlap with a modulation substrate.

For example, in a case where a wiring direction changes because of bending of wiring or of a via or the like inside the wiring substrate, or in a case where connection is made from the wiring of the wiring substrate to the modulation electrode of the modulation substrate, a problem arises in that a part of the modulation signal is released outside to be mixed into the modulation electrode. Such crosstalk of the modulation signal is particularly noticeable in a case where the wiring substrate and the modulation substrate are disposed close to each other. In addition, it is also an important object to eliminate the crosstalk in a case where a plurality of different modulation signals are handled at the same time, or in a case where a plurality of action portions in which an electric field formed by the modulation electrode acts on the optical waveguide are close to each other.

CITATION LIST

Patent Literature

[Patent Literature No. 1] Japanese Laid-open Patent Publication No. 2014-191250

SUMMARY OF INVENTION

Technical Problem

An object to be solved by the present invention is to solve the above problem and to provide an optical modulator that can suppress crosstalk of a modulation signal even in a case where a wiring substrate is disposed to overlap with a modulation substrate. In addition, another object is to provide an optical transmission apparatus using the optical modulator.

Solution to Problem

In order to solve the above objects, an optical modulator and an optical transmission apparatus of the present invention have the following technical features.

(1) An optical modulator including a modulation substrate that includes an optical waveguide and a modulation electrode for modulating a light wave which propagates through the optical waveguide, and a wiring substrate provided with wiring for relaying a modulation signal to be applied to the modulation electrode, in which the wiring substrate is disposed to overlap with the modulation substrate to cover an action portion on which modulation is performed by the modulation electrode, and an electromagnetic wave absorption member is disposed at at least a part of a position facing the action portion in the wiring substrate.

(2) In the optical modulator according to (1), the electromagnetic wave absorption member is connected to any of ground wiring of the wiring substrate or a ground electrode of the modulation electrode.

(3) In the optical modulator according to (1) or (2), in the action portion, a plurality of Mach-Zehnder type optical waveguides are disposed parallel to each other, and the modulation electrode is disposed corresponding to each Mach-Zehnder type optical waveguide.

(4) In the optical modulator according to any one of (1) to (3), the modulation electrode includes a signal electrode and ground electrodes disposed to interpose the signal electrode, and a distance between the signal electrode and the electromagnetic wave absorption member is greater than a clearance between the signal electrode and the ground electrode.

(5) In the optical modulator according to (3), the modulation electrode includes a signal electrode and a ground electrode, and the ground electrode and the electromagnetic wave absorption member are disposed to face each other between a specific Mach-Zehnder type optical waveguide and another Mach-Zehnder type optical waveguide adjacent to the specific Mach-Zehnder type optical waveguide.

(6) In the optical modulator according to (5), in a plan view of the ground electrode and the electromagnetic wave absorption member, the electromagnetic wave absorption member is disposed inside the ground electrode, and a distance S between edge lines of the ground electrode and the electromagnetic wave absorption member satisfies an expression below using a width W of the signal electrode adjacent to the ground electrode and a clearance G between the signal electrode and the ground electrode.

$$S \geq 2G + W \qquad \text{Expression}$$

(7) In the optical modulator according to (5) or (6), the electromagnetic wave absorption member extends to an outside of the action portion along the signal electrode.

(8) In the optical modulator according to any one of (1) to (7), a terminator electrically connected to the modulation electrode is disposed on the wiring substrate.

(9) In the optical modulator according to any one of (1) to (8), a driver circuit element that generates the modulation signal to be applied to the modulation electrode is disposed adjacent to the modulation substrate, and an output terminal of the driver circuit element is connected to the wiring of the wiring substrate.

(10) An optical transmission apparatus includes the optical modulator according to any one of (1) to (9), and a signal generator that generates a modulation signal to be input into the driver circuit element.

Advantageous Effects of Invention

According to the present invention, an optical modulator includes a modulation substrate that includes an optical waveguide and a modulation electrode for modulating a light wave which propagates through the optical waveguide, and a wiring substrate provided with wiring for relaying a modulation signal to be applied to the modulation electrode, in which the wiring substrate is disposed to overlap with the modulation substrate to cover an action portion on which modulation is performed by the modulation electrode, and an electromagnetic wave absorption member is disposed at a position facing the action portion in the wiring substrate. Thus, it is possible to provide an optical modulator that can effectively suppress crosstalk of a modulation signal even in a case where a wiring substrate is disposed to overlap with a modulation substrate.

DESCRIPTION OF EMBODIMENTS

Hereinafter, the present invention will be described in detail using preferred examples.

As illustrated in FIGS. 1A and 1B to FIG. 10, the present invention is characterized by an optical modulator including a modulation substrate 1 that includes an optical waveguide and a modulation electrode 10 for modulating a light wave which propagates through the optical waveguide, and a wiring substrate 2 provided with wiring 22 for relaying a modulation signal to be applied to the modulation electrode 10, in which the wiring substrate is disposed to overlap with the modulation substrate to cover an action portion on which modulation is performed by the modulation electrode, and an electromagnetic wave absorption member SH is disposed at at least a part of a position facing the action portion in the wiring substrate.

Figure 1A:
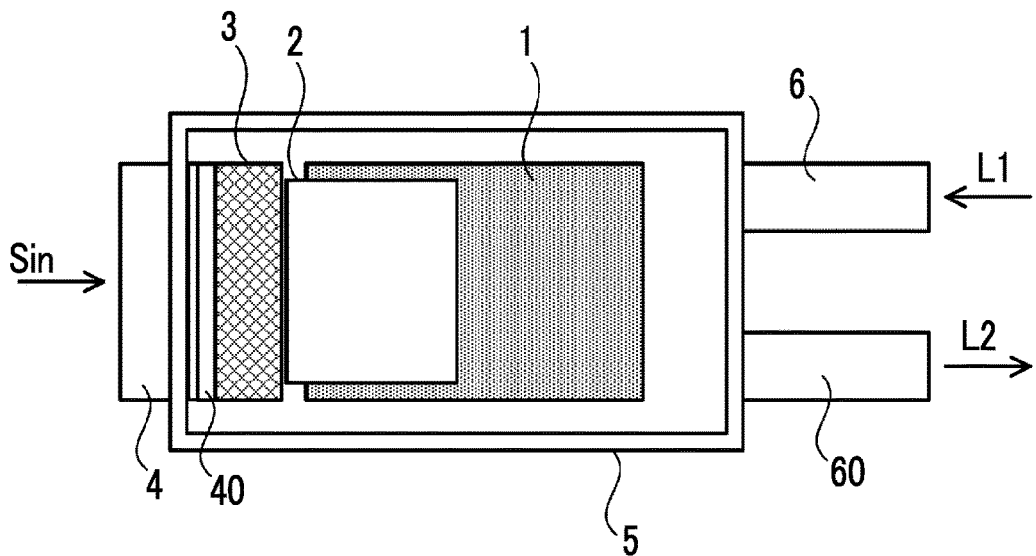
FIGS. 1A and 1B are diagrams illustrating an example of an optical modulator according to the present invention.
Figure 1B:
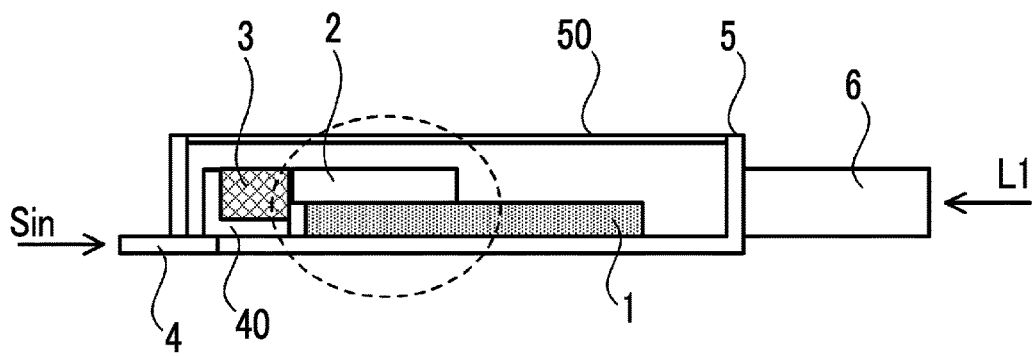

FIG. 1 is a plan view illustrating an example of an optical modulator. In the related art, an optical modulator in the form of introducing input light into one end surface and of deriving output light from an other end surface of the optical modulator has been mainly used. However, in recent years, as illustrated in FIGS. 1A and 1B, an input collimator 6 for introducing input light L1 and an output collimator 60 for deriving output light L2 have been disposed together on a side (the right side in the drawing) of the optical modulator to achieve convenience of connection related to optical signals. An optical waveguide is formed in the modulation substrate 1, in which the input light L1 is input and a light wave related to the output light L2 is output.

Meanwhile, an input terminal 4 for inputting a modulation signal Sin is provided on a side opposite to input and output units of the light wave. The input terminal 4 includes flexible wiring, a connector terminal, or the like. In addition, the modulation signal Sin is generated by a digital signal processor (DSP) or the like disposed outside a case. The modulation signal Sin input from the input terminal 4 is input into a driver circuit element 3 through a circuit substrate 40. In the driver circuit element 3, signal amplifiers are connected in multiple stages, and an amplified modulation signal is output. The modulation signal output by the driver circuit element 3 is applied to the modulation electrode of the modulation substrate 1 through the wiring substrate 2.

The driver circuit element 3 may be accommodated inside a case 5 in the same manner as the modulation substrate 1 and can also be disposed outside the case 5. In addition, reference sign 50 denotes a lid member for airtightly sealing the case 5.

As the modulation substrate, a ferroelectric substrate of lithium niobate (LN), lithium tantalate (LT), lead lanthanum zirconate titanate (PLZT), or the like having an electro-optic effect or a reinforcing substrate on which a vapor-phase growth film made of these materials is formed can be used. In addition, substrates in which various materials including semiconductor materials such as InP, organic materials, or the like are used can also be used.

As a method of forming the optical waveguide, it is possible to use a rib type optical waveguide in which a part corresponding to the optical waveguide has a protruding shape, in the substrate by, for example, etching a substrate surface other than the optical waveguide or by forming grooves on both sides of the optical waveguide. In addition, it is also possible to form the optical waveguide by forming a high-refractive index part on the substrate surface with Ti or the like using a thermal diffusion method, a proton conversion method, or the like. It is also possible to form a composite optical waveguide by, for example, diffusing a high-refractive index material in the rib type optical waveguide part.

The modulation substrate in which the optical waveguide is formed may be configured to have a thickness of 10 μm or lower and more preferably 5 μm or lower as a thin plate in order to achieve velocity matching between a microwave of the modulation signal and the light wave. In addition, a height of the rib type optical waveguide is set to 2 μm or lower and more preferably 1 μm or lower. In addition, it is also possible to form a vapor-phase growth film on the reinforcing substrate and to process the film to have a shape of the optical waveguide.

The modulation substrate configured as a thin plate is adhesively fixed to the reinforcing substrate through direct joining or through an adhesive layer of resin or the like in order to increase mechanical strength. As the reinforcing substrate for direct joining, a material such as quartz that has a lower refractive index than the optical waveguide or than the substrate in which the optical waveguide is formed, and that has a similar coefficient of thermal expansion to the optical waveguide or the like is preferably used. In addition, in joining to the reinforcing substrate through the adhesive layer, the same material as the thin plate such as an LN substrate can be used as the reinforcing substrate.

The modulation electrode or a bias electrode is formed along the optical waveguide. As a method of forming the electrode, the electrode can be configured by laminating an underlying metal of Au, Ti, or the like with Au using a plating method.

Figure 2:
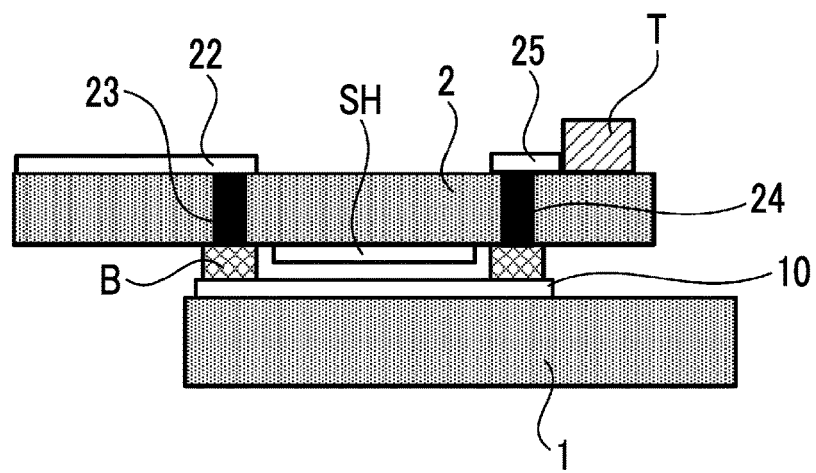
FIG. 2 is a partial enlarged side view of the optical modulator in FIGS. 1A and 1B.

FIG. 2 is an enlarged view of a dotted frame part in FIG. 1B, in which the wiring 22 (25) for propagating the modulation signal is formed in the wiring substrate 2. An insulating substrate in which a ceramic material of alumina or of aluminum nitride is used is used in the wiring substrate 2. Electric wiring is formed on an upper surface or a lower surface of the wiring substrate 2 in FIG. 2. In addition, a terminator T for the modulation signal is formed in the wiring substrate 2.

Vias 23 and 24 are provided in the wiring substrate 2, and wiring is connected to an opposite surface of the substrate. Connection between the wiring substrate (a connection wiring part (pad portion) formed on a back surface of the wiring substrate) and the modulation electrode 10 of the modulation substrate 1 is made using flip chip bonding. Specific examples include a method of forming the pad portion of the wiring substrate with an Au electrode pad and of connecting the pad portion to an Au electrode of the modulation electrode using pressure bonding by applying heat/vibration, or a bump connection using a conductive adhesive B.

As illustrated in FIG. 2, the modulation signal is introduced into the modulation electrode 10 from the wiring 22 through the via 23 and through the bump B. Then, the modulation signal reaches the wiring 25 through the bump and through the via 24 and reaches the terminator T including a termination resistor or the like. The terminator T acts as a heat source and thus may be separated as far as possible from the substrate 1.

A feature of the optical modulator of the present invention is disposing the electromagnetic wave absorption member SH at a position facing the modulation substrate 1 (the action portion of the modulation electrode 10) in the wiring substrate 2 as illustrated in FIG. 2. The electromagnetic wave absorption member may include a sintered ferrite material in which iron, carbon, nickel, Kovar, or the like is used.

The electromagnetic wave absorption member may be connected to any of ground wiring of the wiring formed in the wiring substrate 2 or a ground electrode (a part of the modulation electrode) of the modulation electrode 1 to be set to a ground potential.

Figure 3:
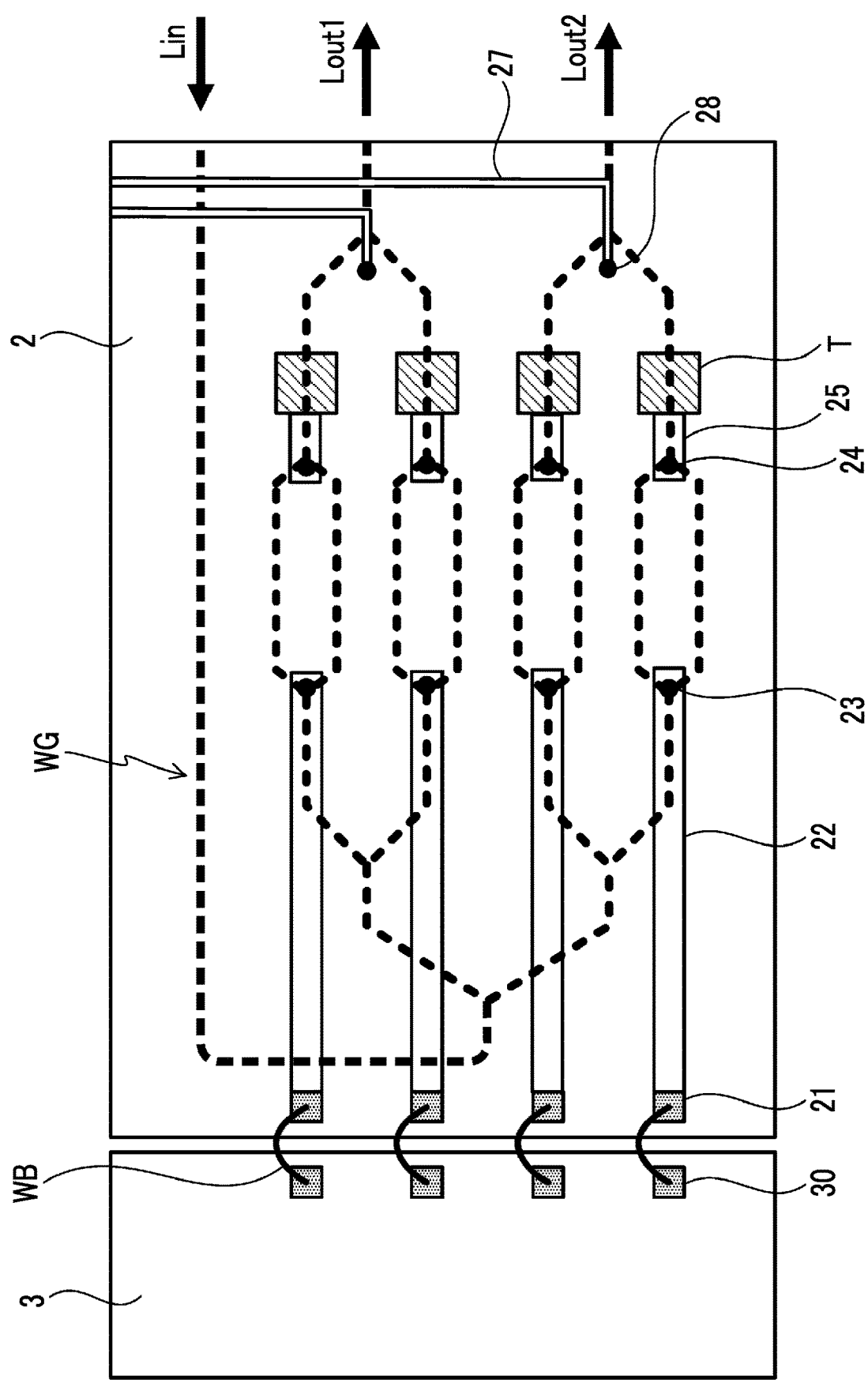
FIG. 3 is a diagram for describing a wiring substrate used in another example of the optical modulator according to the present invention.

FIGS. 3 to 9 illustrate examples in which two nest type optical waveguides are used as the optical waveguide. FIG. 3 illustrates the wiring substrate 2, and the optical waveguide formed in the other modulation substrate is illustrated by dotted line WG. Reference sign 3 is the driver circuit element, and the modulation signal is transmitted to a pad portion 21 of the wiring of the wiring substrate 2 from an output terminal 30 formed on an upper surface of the driver circuit element through wire bonding WB. The modulation signal is guided to the back surface of the wiring substrate 2 from the pad portion 21 through the wiring 22 and through the via 23.

Figure 4:
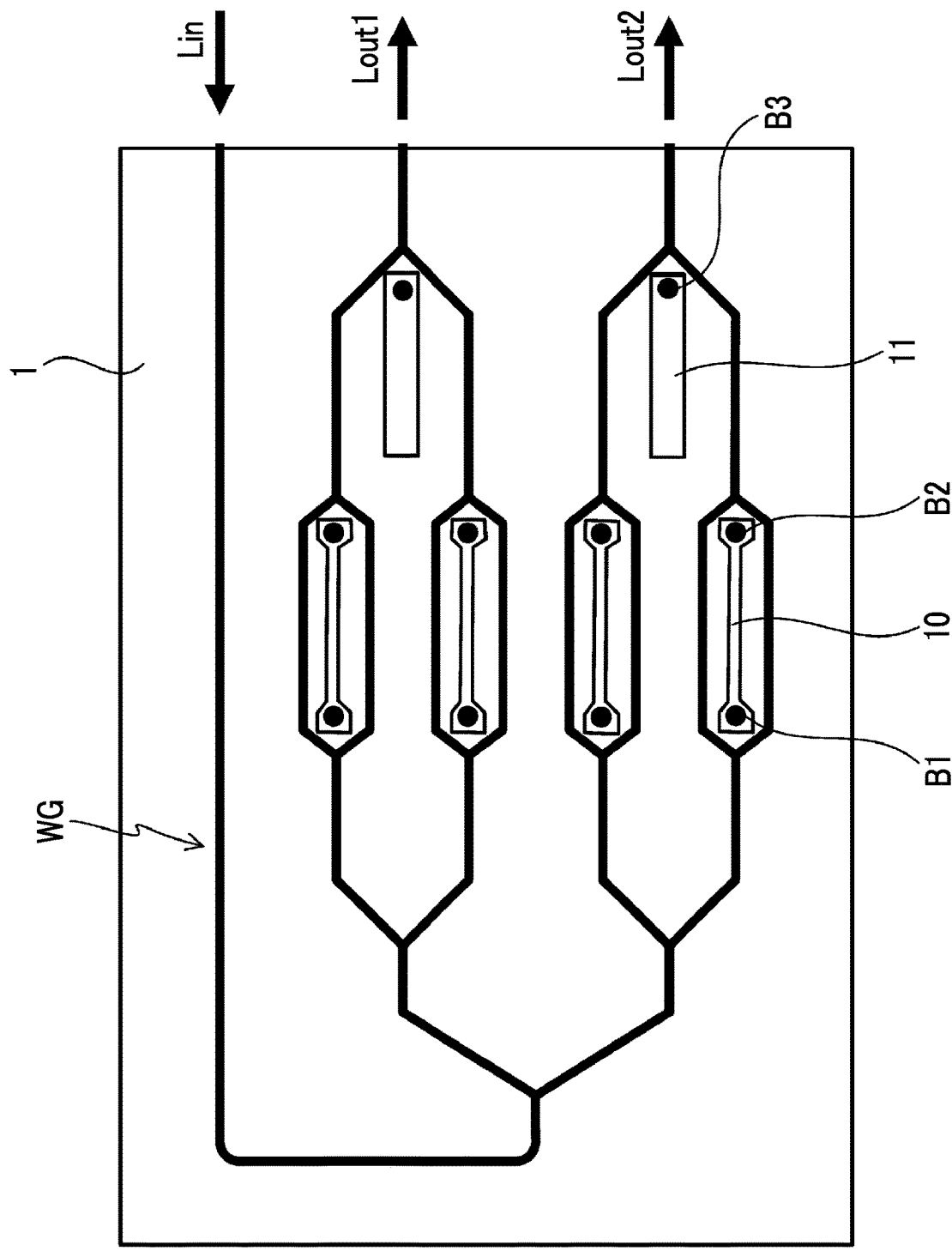
FIG. 4 is a diagram for describing a modulation substrate used in the optical modulator in FIG. 3.
Figure 5:
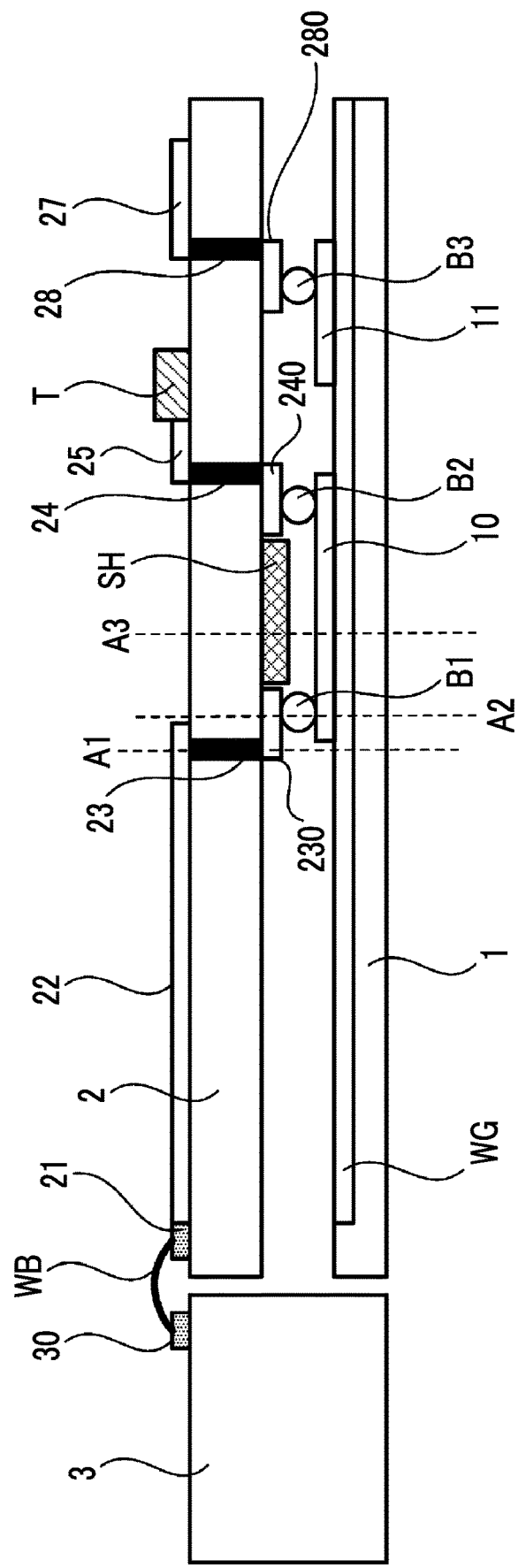
FIG. 5 is a side view related to the optical modulator in FIG. 3 and FIG. 4.

As illustrated in FIG. 5, the modulation signal that has passed through the via 23 reaches wiring 230 formed on the back surface of the wiring substrate 2 and is transmitted to the modulation electrode 10 of the modulation substrate 1 through a bump connection B1. FIG. 4 is a diagram of a plan view of the modulation substrate 1. The optical waveguide WG or the modulation electrode 10, and a bias electrode 11 are formed in the modulation substrate 1. The ground electrode formed to interpose the modulation electrode, and the like are not illustrated for simplification of the drawing.

The modulation signal that has passed through the modulation electrode 10 propagates to wiring 240 of the wiring substrate 2 through a bump connection B2 and furthermore, reaches the terminator T through the via 24 and through the wiring 25. The terminator T has a circuit configuration in which a termination resistor and the like are combined, and acts as a heat source because of conversion of the modulation signal into heat energy. As in FIG. 1B, since the wiring substrate 2 is airtightly sealed inside the metal case 5 together with the modulation substrate 1, the terminator T may be disposed separately from the modulation substrate 1, particularly the action portion of the modulation electrode 10.

While the bias electrode 11 is formed in the modulation substrate 1 in order to control a bias voltage of optical modulation, voltage supply to the bias electrode 11 can be provided through wiring 27 of the wiring substrate 2, a via 28, wiring 280, and a bump connection B3 in FIGS. 3 and 5.

As illustrated in FIG. 3 and FIG. 4, in the action portion in which the modulation electrode 10 causes an electric field to act on the optical waveguide, a plurality of Mach-Zehnder type optical waveguides are disposed parallel to each other. The modulation electrode is disposed corresponding to each Mach-Zehnder type optical waveguide. Different modulation signals are applied to each modulation electrode 10, and crosstalk is also generated between the modulation signals. In the present invention, as illustrated in FIG. 5, the electromagnetic wave absorption member SH is disposed on the wiring substrate 2 in accordance with the action portion of the modulation electrode 10. The electromagnetic wave absorption member SH suppresses mixing of a part of the modulation signals leaking from the wiring substrate 2 side into the modulation electrode 10. While the electromagnetic wave absorption member SH is formed on a surface of the wiring substrate 2, the electromagnetic wave absorption member SH may also be formed by forming a recess portion in the wiring substrate 2 and by embedding the electromagnetic wave absorption member SH in the recess portion, as necessary.

Figure 6A:
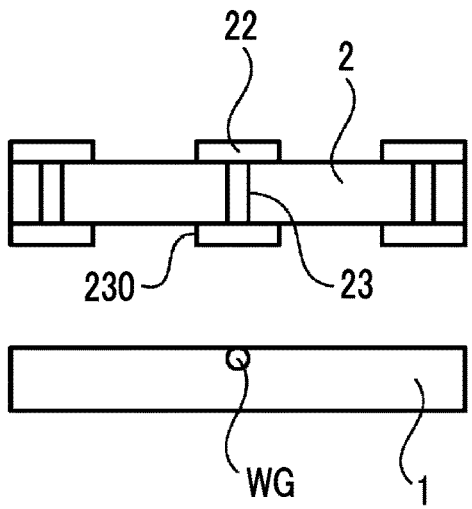
FIGS. 6A to 6C are cross section views taken along dotted lines A1 to A3 shown in the optical modulator in FIG. 5.
Figure 6B:
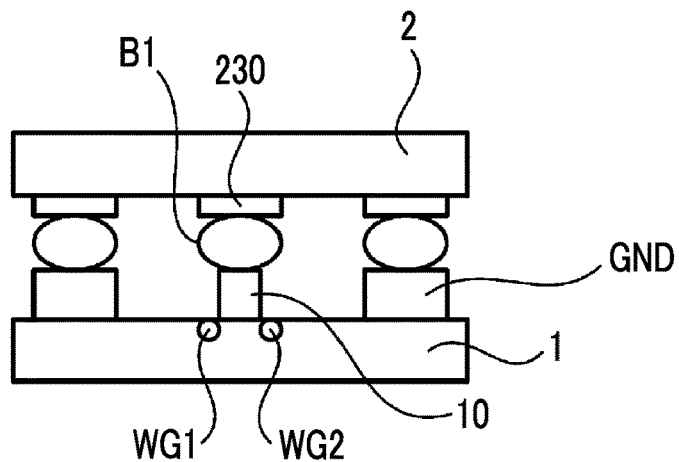
Figure 6C:
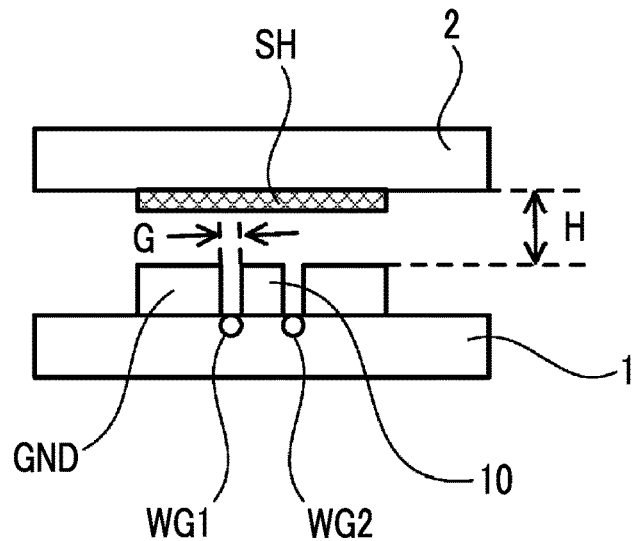

A part of each of cross section views taken along dotted lines A1 to A3 in FIG. 5 is illustrated in FIGS. 6A to 6C. Here, reference signs WG1 and WG2 illustrated in FIGS. 6B and 6C denote branched waveguides of one Mach-Zehnder type optical waveguide of the optical waveguide WG.

Particularly, as illustrated in FIG. 6C, the modulation electrode includes the signal electrode 10 and a ground electrode GND disposed to interpose the signal electrode 10, and a distance H between the signal electrode and the electromagnetic wave absorption member SH is set to be greater than a clearance G between the signal electrode 10 and the ground electrode GND. This is done so that the presence of the electromagnetic wave absorption member does not hinder an electric field formed between the signal electrode and the ground electrode.

An example of disposing the electromagnetic wave absorption member SH over the signal electrode is illustrated in FIGS. 6A to 6C. In this case, there is a possibility that a part of the electric field formed between the signal electrode and the ground electrode is absorbed into the electromagnetic wave absorption member, and that the electric field to be applied to the branched waveguides WG1 and WG2 is weakened. In order to eliminate this problem, an example of disposing the electromagnetic wave absorption member to face the ground electrode disposed between the signal electrodes 10 will be described in FIGS. 7 to 9.

Figure 7:
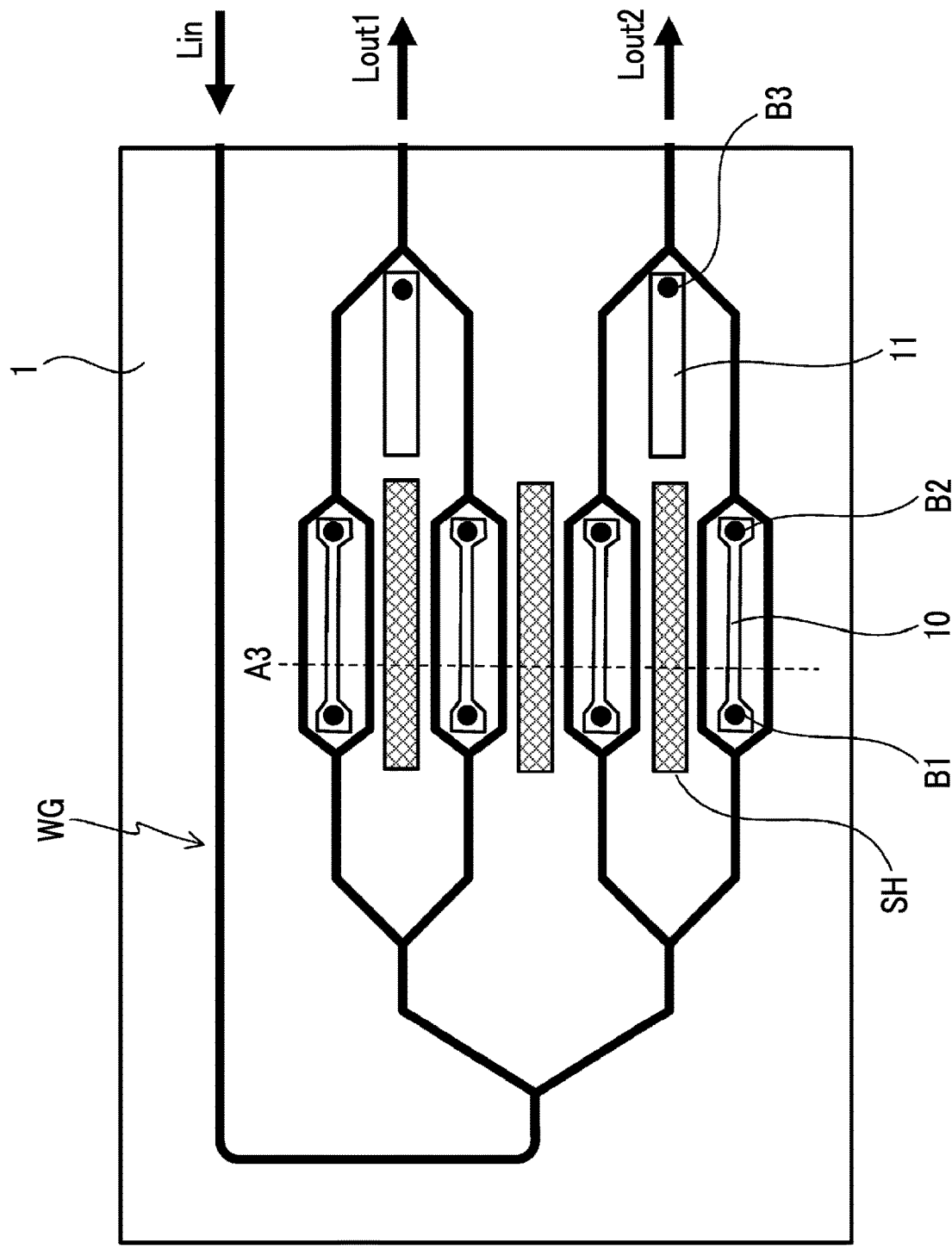
FIG. 7 is a diagram illustrating an example of a pattern of disposition of an electromagnetic wave absorption member.

FIG. 7 is a diagram in which a pattern of disposition of the electromagnetic wave absorption member SH disposed on the wiring substrate 2 is superimposed on the modulation substrate 1 in FIG. 4. The electromagnetic wave absorption member SH is disposed between adjacent Mach-Zehnder type optical waveguides or between signal electrodes.

Figure 8:
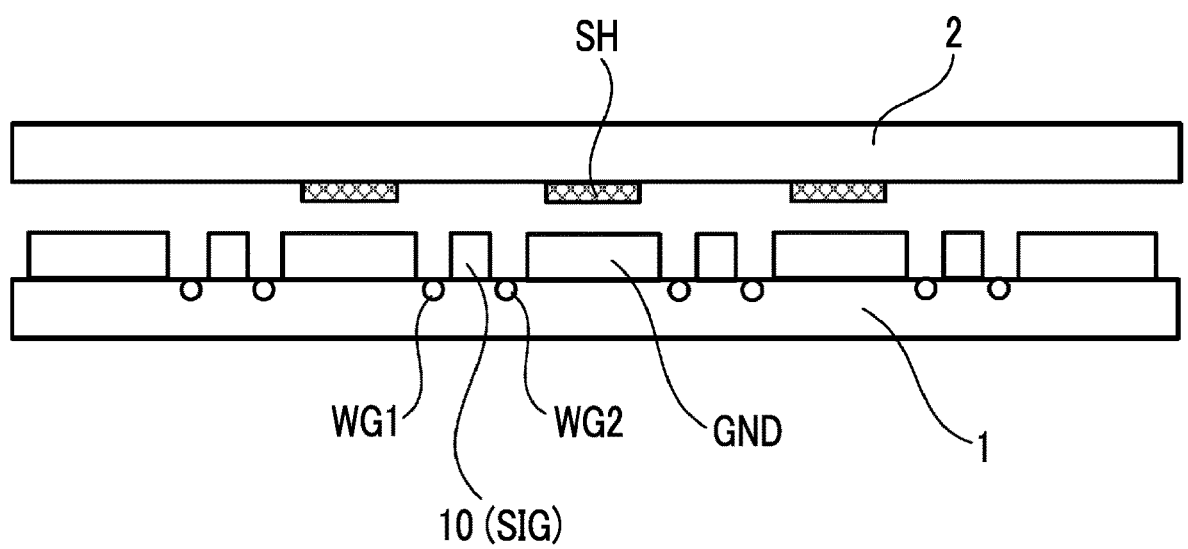
FIG. 8 is a cross section view taken along dotted line A3 in FIG. 7.

FIG. 8 is a cross section view taken along dotted line A3 in FIG. 7. The ground electrode GND is disposed between adjacent Mach-Zehnder type optical waveguides (between signal electrodes), and the electromagnetic wave absorption member SH is disposed on the wiring substrate 2 to face the ground electrode. The electromagnetic wave absorption member SH and the ground electrode GND effectively suppress crosstalk between the modulation signals applied to the action portions of the adjacent Mach-Zehnder type optical waveguides. In addition, since the electromagnetic wave absorption member SH is not disposed over the signal electrodes, absorption of the electric fields formed by the signal electrodes is also suppressed.

Figure 9:
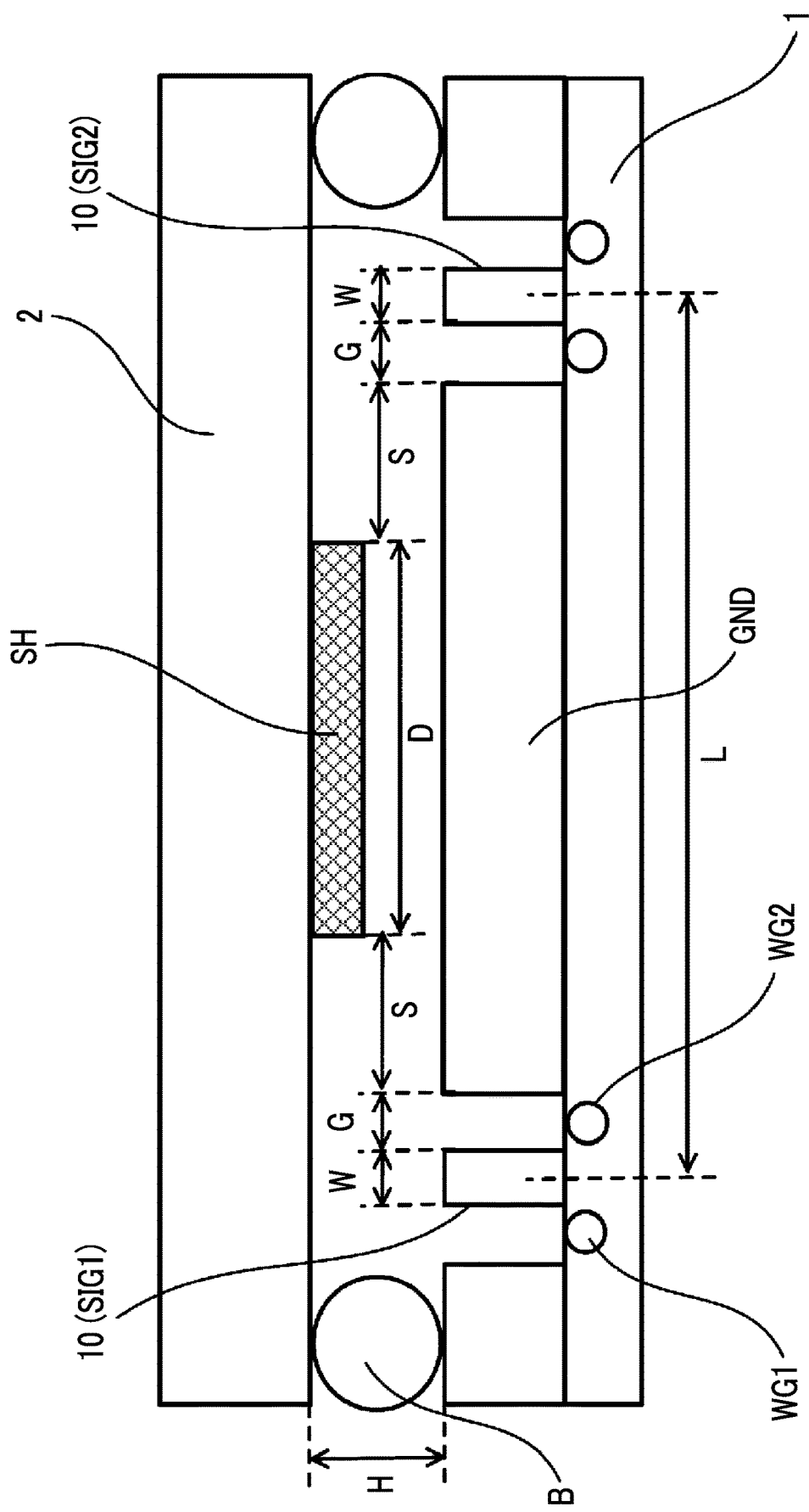
FIG. 9 is a partial enlarged view of FIG. 8 and is a diagram for describing a position of disposition of the electromagnetic wave absorption member.

FIG. 9 is a further enlarged view of a part of FIG. 8. The bump B that electrically connects the ground electrode GND to the ground wiring provided in the wiring substrate 2 is also illustrated for reference. The height H of the bump B is approximately 50 μm.

In a plan view of the ground electrode GND and the electromagnetic wave absorption member SH in FIG. 9 from above the drawing, the electromagnetic wave absorption member SH is disposed inside the ground electrode GND. In addition, a distance S between edge lines of the ground electrode GND and the electromagnetic wave absorption member SH is set to minimize an effect on the electric field formed by the signal electrode 10 (SIG1 or SIG2). Specifically, the distance S is set to satisfy the following expression using a width W of the signal electrode adjacent to the ground electrode and the clearance G between the signal electrode and the ground electrode.

$$S \geq 2G+W \quad \text{Expression}$$

Furthermore, as illustrated in FIG. 7, by extending a length of the electromagnetic wave absorption member SH in a direction of propagation of the modulation signal (a direction along the signal electrode 10) to the outside of the action portion of the signal electrode 10, a crosstalk signal that radiates from the bump connection B1 which is a connection portion between the wiring 230 formed on the back surface of the wiring substrate 2 and the modulation electrode 10 of the modulation substrate 1 can be effectively blocked. A region (a width in a horizontal direction of the drawing) of the action portion in FIG. 7 almost matches a length of the signal electrode 10. In FIG. 7, the length of the electromagnetic wave blocking member SH is longer than the length of the signal electrode 10.

Figure 10:
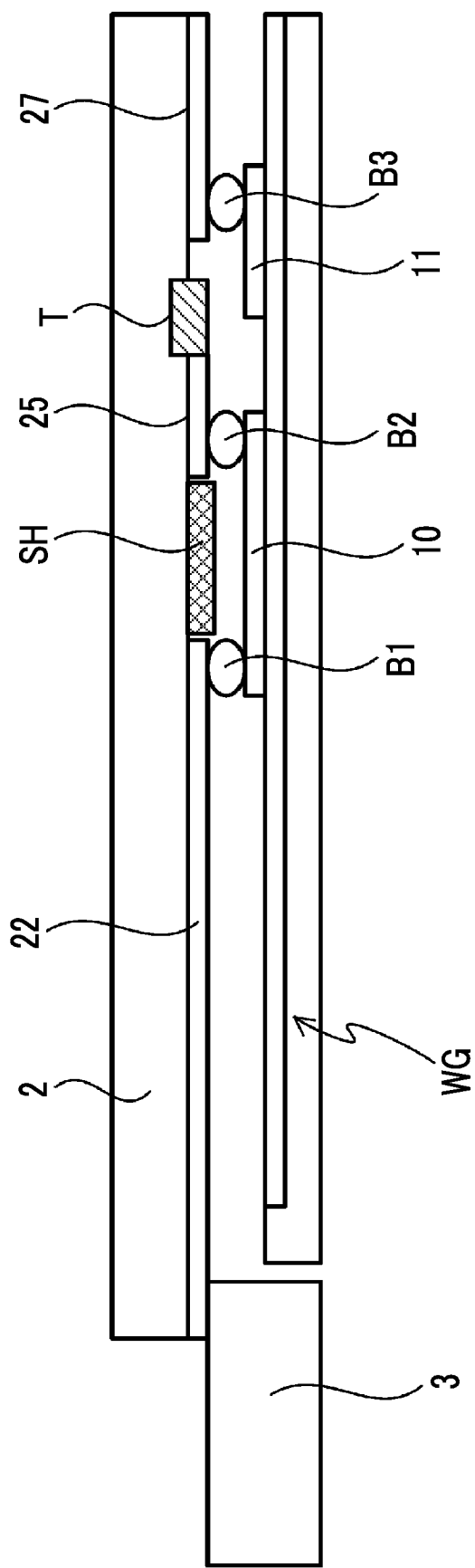
FIG. 10 is a diagram for describing still another example related to the optical modulator according to the present invention.

FIG. 10 is a modification example of FIG. 5, in which the wiring 22 and the like are provided on the back surface of the wiring substrate 2. The driver circuit element 3 that is disposed adjacent to the modulation substrate 1 and that generates the modulation signal to be applied to the modulation electrode 10 is disposed, and the wiring 22 of the wiring substrate 2 is connected to the output terminal formed on the upper surface of the driver circuit element. Accordingly, the wire bonding WB in FIG. 5 is omitted, and wiring can be simplified. While the terminator T is provided on the lower surface of the wiring substrate 2 in FIG. 10, it is, of course, possible to dispose the terminator T on the upper surface of the wiring substrate 2 as in FIG. 5.

It is also possible to provide an optical transmission apparatus having the same effects by including the optical modulator described above and a signal generator that generates a modulation signal to be input to the driver circuit element in the optical modulator.

INDUSTRIAL APPLICABILITY

As described so far, according to the present invention, it is possible to provide an optical modulator that can suppress crosstalk of a modulation signal even in a case where a wiring substrate is disposed to overlap with a modulation substrate. In addition, it is also possible to provide an optical transmission apparatus using the optical modulator.

REFERENCE SIGNS LIST

1: modulation substrate
2: wiring substrate
3: driver circuit element
SH: electromagnetic wave absorption member

The invention claimed is:

1. An optical modulator comprising:
a modulation substrate that includes an optical waveguide and a modulation electrode for modulating a light wave which propagates through the optical waveguide; and
a wiring substrate provided with wiring for relaying a modulation signal to be applied to the modulation electrode,
wherein the wiring substrate is disposed to overlap with the modulation substrate to cover an action portion on which modulation is performed by the modulation electrode,
an electromagnetic wave absorption member is disposed in the wiring substrate at at least a part of a position facing the action portion,
the modulation electrode includes a signal electrode and a ground electrode disposed to interpose the signal electrode,
the electromagnetic wave absorption member is disposed to face the ground electrode and is not disposed over the signal electrode, and
a length of the electromagnetic wave absorption member extends in a direction along the signal electrode to an outside of the action portion of the signal electrode.

2. The optical modulator according to claim 1,
wherein the electromagnetic wave absorption member is connected to any of ground wiring of the wiring substrate or a ground electrode of the modulation electrode.

3. The optical modulator according to claim 1,
wherein in the action portion, a plurality of Mach-Zehnder type optical waveguides are disposed parallel to each other, and the modulation electrode is disposed corresponding to each Mach-Zehnder type optical waveguide.

4. The optical modulator according to claim 1,
wherein a distance between the signal electrode and the electromagnetic wave absorption member is greater than a clearance between the signal electrode and the ground electrode.

5. The optical modulator according to claim 3,
wherein the ground electrode and the electromagnetic wave absorption member are disposed to face each other between a specific Mach-Zehnder type optical waveguide and another Mach-Zehnder type optical waveguide adjacent to the specific Mach-Zehnder type optical waveguide.

6. The optical modulator according to claim 5,
wherein in a plan view of the ground electrode and the electromagnetic wave absorption member, the electromagnetic wave absorption member is disposed inside the ground electrode, and a distance S between edge lines of the ground electrode and the electromagnetic wave absorption member satisfies an expression below using a width W of the signal electrode adjacent to the ground electrode and a clearance G between the signal electrode and the ground electrode $$S \geq 2G + W \quad \text{Expression.}$$

7. The optical modulator according to claim 1,
wherein a terminator electrically connected to the modulation electrode is disposed on the wiring substrate.

8. The optical modulator according to claim 1,
wherein a driver circuit element for generating the modulation signal to be applied to the modulation electrode is disposed adjacent to the modulation substrate, and an output terminal of the driver circuit element is connected to the wiring of the wiring substrate.

9. An optical transmission apparatus comprising:
the optical modulator according to claim 8; and
a signal generator that generates a modulation signal to be input into the driver circuit element.

* * * * *